United States Patent [19]

Alexander et al.

[11] Patent Number: 5,616,160

[45] Date of Patent: Apr. 1, 1997

[54] PROCESS FOR VITRIFYING INCINERATOR ASH

[75] Inventors: M. Grayson Alexander, Newfield; John L. Stempin, Beaver Dams; Dale R. Wexell, Corning, all of N.Y.

[73] Assignee: Corning Incorporated, Corning, N.Y.

[21] Appl. No.: 379,149

[22] Filed: Jan. 27, 1995

Related U.S. Application Data

[63] Continuation of Ser. No. 66,989, May 24, 1993, abandoned.

[51] Int. Cl.$^6$ .................................................... C03B 3/02
[52] U.S. Cl. .............................. 65/27; 65/134.8; 388/253; 106/DIG. 1; 106/624; 423/240 R; 501/155
[58] Field of Search ............................. 65/134.8, 19, 27; 588/556, 253; 106/DIG. 1, 624; 423/240 R; 501/155

[56] References Cited

U.S. PATENT DOCUMENTS

| | | |
|---|---|---|
| 4,299,611 | 11/1981 | Penberthy . |
| 4,414,013 | 11/1983 | Connell . |
| 4,430,108 | 2/1989 | Hojaji . |
| 4,661,291 | 4/1987 | Yamasaki et al. . |
| 4,666,490 | 5/1987 | Drake . |
| 4,678,493 | 7/1987 | Roberts et al. . |
| 4,735,784 | 4/1988 | Davis . |
| 4,944,785 | 7/1990 | Sorg et al. . |
| 4,988,376 | 1/1991 | Mason et al. . |
| 5,024,556 | 6/1991 | Timmerman . |
| 5,024,822 | 6/1991 | Hittner . |
| 5,035,735 | 7/1991 | Pieper et al. . |
| 5,041,398 | 8/1991 | Kauser et al. . |
| 5,164,008 | 11/1992 | Casey et al. . |
| 5,177,305 | 1/1993 | Pichat . |
| 5,188,649 | 2/1993 | Macdo et al. . |
| 5,203,901 | 4/1993 | Suzuki et al. . |
| 5,220,112 | 6/1993 | Bucci . |
| 5,237,940 | 8/1993 | Pieper . |
| 5,273,566 | 12/1993 | Balcar . |

FOREIGN PATENT DOCUMENTS

| | | |
|---|---|---|
| 2228476A | 2/1990 | European Pat. Off. . |
| 2256037A | 2/1990 | European Pat. Off. . |
| 0448174A1 | 3/1991 | European Pat. Off. . |
| 0493217A1 | 12/1991 | European Pat. Off. . |
| 57-55476 | 11/1982 | Japan . |
| 60-56963 | 12/1985 | Japan . |

Primary Examiner—John Hoffmann
Attorney, Agent, or Firm—Milton M. Peterson; Timothy M. Schaeberle

[57] ABSTRACT

The invention relates to a process of eliminating high chloride-containing incinerator ash and incinerator ash-residue mixtures, without generating excessive heavy metal-containing effluents during the actual vitrification of the ash. The process involves first pretreating the incinerator ash or ash-residue mixture, if needed, whereby the resultant ash contains less than about 3% halogen by weight and less than about 3% C.. Following the pretreatment, the ash is dried and then mixed with any additives needed to make up a vitrifiable batch mixture which will, when subsequently vitrified, form a glass possessing an excellent acid durability. A durability whereby such that the weight loss of the glass in 5% HCl solution at 95° C. is 2.0 mg/cm$^2$ or less in 24 hours. This durability results in minimal or non-detectable leaching of hazardous heavy metal or non-metallic specie and is sufficient enough durability such that the vitrified glass will easily pass the EPA's test for leachability. A suitable glass meeting the requirements is comprised of, expressed in terms of weight percent, about 47–76% $SiO_2$; 8–29% $Al_2O_3$, 3.4–33.0% CaO; and optionally 0–25% $R_2O$, wherein $R_2O$ is selected from the group consisting of $Na_2$, $Li_2O$, and $K_2O$; 0–5% $Fe_2O_3$; 0–18% $B_2O_3$; 0–7% $ZrO_2$; 0–7% $TiO_2$; 0–10% MO, wherein MO is selected from the group consisting of MgO, BaO, ZnO or SrO; 0–8% of at least one member selected from the group consisting of PbO, CdO, $Cr_2O_3$, CuO, and NiO; and 0–4% $SO_3$ with 0–4% Cl+F as batched.

19 Claims, 2 Drawing Sheets

PROCESS FOR VITRIFYING INCINERATOR ASH

CROSS REFERENCE TO RELATED APPLICATION:

This is a continuation of application Ser. No. 08/066,989 filed May 24, 1993 now abandoned.

BACKGROUND OF THE INVENTION

This invention relates to an environmentally safe method for the disposal of incinerator ash. Specifically, this invention discloses a vitrification process whereby municipal waste combustor incinerator ash, either with a high or low halogen content, containing heavy metal species is subjected to high temperatures and vitrified into a homogeneous, single-phase glass.

Municipal solid waste incinerators produce ash which contains small quantities of heavy metals, such as lead, zinc, mercury, cadmium and chromium; generally less than 0.5% of each. The immobilization of these metals is necessary to prevent air and groundwater contamination in disposal or recycling. Conventionally, incinerator ash which contains heavy metal contaminants has been used as aggregate with Portland cement to form stable concrete structures. The leaching characteristics of the cured concretes do not consistently satisfy the Environmental Protection Agency's Toxic Characteristic Leaching Procedure (EPA's TCLP test) requirements for hazardous waste, thus allowing it to be delisted. Ash which is used as aggregate is also classified as nonhazardous by the particular states in which it is used. Nevertheless, in many cases, the leachability data is questionable, and the acceptable results may be a result of the dilution of the toxic components by the large volume of the filled concrete.

It is also known to convert waste material into glass by means of melting after adding additives and after mixing into batch. Some of the material is dissolved in the melt, i.e., it is chemically decomposed, and the rest is firmly incorporated in the glass when the latter solidifies after withdrawal from the furnace. It is advantageous that the glass be difficult to leach out, so that release of components contained in the glass can occur only to a small amount, if at all. This permits a disposal without further manufacture of bodies made from the glass. Additionally, vitrification results in a 20–80% reduction in volume of the waste material. This allows the life of a landfill to be expanded significantly.

However, there are still problems which often occur when vitrifying waste materials, especially if these waste materials contain a high percentage of chloride, sulfur and/or carbon species; those problems resulting from the fact that these species are usually absorbed by the melt only to a limited extent. For example, typical incinerator ash containing low chloride is usually combined with the high Cl scrubber residue, which is generated in state-of-the-art incinerators utilizing CaO injection scrubbers; the resultant ash-residue mixture then containing chloride levels greater than 15%. In an open melt operation the presence of these species typically leads to the disadvantageous formation of large amounts of exhaust gas which can contain $Cl_2$, HCl, $SO_x$, CO and the like. Furthermore, the heavy metal and alkali metal species are volatilized and they too enter the exhaust gas from the glass melt. All of this excessive effluent generation requires purification and extensive exhaust gas collection systems which involve significant cost. Although a cold crown melting system would alleviate the heavy metal volatilization, the excess chlorine still would cause excessive gaseous evolution, i.e., HCl and volatile metal chlorides. These, in turn, lead to batch bridging, formation of gas pockets and occasional formation of molten salt layers (e.g., $CaCl_2$) in the batch blanket. Furthermore, any resultant glass may contain in excess of 10% Cl which reduces the ultimate acid durability below acceptable levels. In other words, high chloride incinerator ash cannot be conventionally melted, or even continuously melted in a cold crown melting system, without the removal of an appreciable quantity of the Cl.

SUMMARY OF THE INVENTION

Hence, the present invention is a process of disposing of high chloride-containing incinerator ash and incinerator ash-residue mixtures, without generating excessive heavy metal-containing effluents during the actual vitrification of the ash. Furthermore, this environmentally safe method for the disposal of incinerator ash involves a vitrification process whereby municipal waste combustor incinerator ash containing heavy metal species is subjected to high temperatures and vitrified into a homogeneous, single-phase glass.

The present invention comprises first pretreating the incinerator ash or ash-residue mixture, if needed, such that the resultant ash contains less than about 3% halogen and 3% carbon, by weight. Once pretreated, the ash is dried and then mixed with any additives in order to make up a vitrifiable batch mixture which will, when subsequently vitrified, form a homogenous single-phase glass possessing an excellent acid durability. An excellent durability is defined as a weight loss of the glass in 5% HCl solution at 95° C. of 10.0 mg/cm$^2$ or less in 24 hours; i.e., a glass with minimal or non-detectable leaching of hazardous heavy metal or non-metallic species is such that the vitrified glass will easily pass the EPA's test for leachability. In addition, the glass should preferably possess a viscosity of less than about 1000 poise in the temperature range of about 1000°–1500° C. Once mixed, the batch is then continuously vitrified using a cold crown melting process which subjects the melt to high temperatures. Unlike hot crown or open melts where commonly up to 80% of the Pb, Cd, and Zn are lost as volatile species, no significant volatile heavy metal species are lost as exhaust during this cold crown melting process.

A suitable glass meeting the requirements is comprised of, expressed in terms of weight percent, about 47–76% $SiO_2$, 0.8–29% $Al_2O_3$, 3.4–33.0% CaO, and optionally 0–25% $R_2O$, wherein $R_2O$ is selected from the group consisting of $Na_2O$, $Li_2O$ and $K_2O$, 0–5% $Fe_2O_3$, 0–18% $B_2O_3$, 0–7% $ZrO_2$, 0–7% $TiO_2$, 0–10% MO, wherein MO is selected from the group consisting of MgO, BaO, ZnO or SrO, 0–8% of at least one member selected from the group consisting of PbO, CdO, $Cr_2O_3$, CuO and NiO, 0–4% $SO_3$ and 0–4% Cl+F as batched.

As a result of this process, the glass chemically incorporates the heavy metals into an amorphous glass structure and immobilizes the heavy metals species present; i.e., the toxic metals are chemically bonded and immobilized in the amorphous matrix of the glass. Such vitrification results in a 20–80% reduction in the volume of ash, thereby extending the ability to store glass product in a non-hazardous landfill after delisting.

A potentially economical and environmentally beneficial impact of vitrifying ash would be the ability to form commercially useful products for industrial or structural applications. Potential uses for acid durable ash-containing glasses include tiles, fibers, containers, tubing, asphalt filler, structural blocks and facing, and specialty cements.

PRIOR ART

Disposal of incinerator ash by incorporation in a vitrification batch has been previously suggested in U.S. Pat. No. 5,035,735 (Pieper et al.) which discloses a process for vitrifying environmentally hazardous waste material. Although this vitrification method requires a batch layer above the molten glass layer, it is differentiated from the present invention in that this prior art method requires the additional formation of an alkali salt or alkaline earth salt gall layer between the molten glass and the batch layer.

U.S. Pat. No. 5,041,398 (Kauser et al.) discloses another method for disposing of fly ash. This reference describes a method where the heavy metal compounds are separated by precipitating them from an ash-containing solution. The heavy metal compounds and the remaining incinerator ash portions are then separately batched and subsequently vitrified. This results in a final volume of vitrified glass which is larger than the initial volume of ash. Unlike this reference, the present invention discloses a method wherein the heavy metal species remain in the incinerator ash. This mixture is then batched and subsequently vitrified resulting in a much smaller volume of vitrified glass than that disclosed in the reference.

British Application No. 2,228,476A, although relevant, contains a fundamental feature of the products disclosed therein which can be clearly differentiated from those disclosed herein. As disclosed in the British reference, the product formed from the process should be crystallized; a requirement which is directly contrary to the totally amorphous product formed by the instant invention. In other words, the invention disclosed herein consists of producing a homogeneous glass body having a uniform composition throughout. In sharp contrast, the composition resulting from the process disclosed in the British reference is akin to a glass-ceramic; a body having a heterogeneous microstructure consisting of one or more crystal phases contained within a residual glassy matrix. Thus, the British reference discloses a product possessing at least two rates of leaching, whereas the instant invention discloses the production of a glass body which enables a strict control of leaching rates by guaranteeing the production of a homogeneous and single-phase glass.

European Patent Application 0 448 174 A1 (Van Eggelen) discloses a method of processing waste materials by adding the waste materials to raw materials and forming a glass wherein the waste materials are incorporated in the final glass product. Unlike the present invention, however, there is no teaching of a pretreatment step which is typically required with incinerator ash in order to reduce the halide and carbon contents to acceptable levels. Furthermore, this reference does not teach one of the key requirements of the instant method; i.e., the production of a glass body which enables a strict control of leaching rates by guaranteeing the production of a homogeneous and single-phase glass. Lastly, the instant invention discloses a glass body which possesses an excellent durability.

A number of other U.S. patents were studied as background and for their possible relevance to patentability in connection with the preparation of this application, namely:

U.S. Pat. No. 4,299,611 Penberthy
U.S. Pat. No. 4,661,291 Yamasaki et at.
U.S. Pat. No. 4,666,490 Drake
U.S. Pat. No. 4,678,493 Roberts et al.
U.S. Pat. No. 4,988,376 Mason et al.
U.S. Pat. No. 5,024,556 Timmerman
U.S. Pat. No. 5,164,008 Casey et at.
U.S. Pat. No. 5,177,305 Piehat
U.S. Pat. No. 5,188,649 Macedo et at.
U.S. Pat. No. 5,203,901 Suzuki et at.

The relevancy of these references is that they pertain to waste vitrification in one form or another. None, however, suggests the present invention.

DETAILED DESCRIPTION OF THE INVENTION

The present invention comprises first pretreating the incinerator ash or ash-residue mixture, if needed, such that the resultant ash contains less than about 3% halogen and 3% carbon, by weight. Once pretreated, the ash is dried and then mixed with any additives in order to make up a vitrifiable batch mixture which will, when subsequently vitrified, form a homogenous single-phase glass possessing an excellent acid durability.

Throughout this application the term "incinerator ash" is defined as either a mixture of entirely incinerator ash or a mixture of incinerator ash and scrubber residue, or a mixture of flyash and bottom ash, or combinations thereof; all of which are produced by state of the an incinerators.

Figure 1:
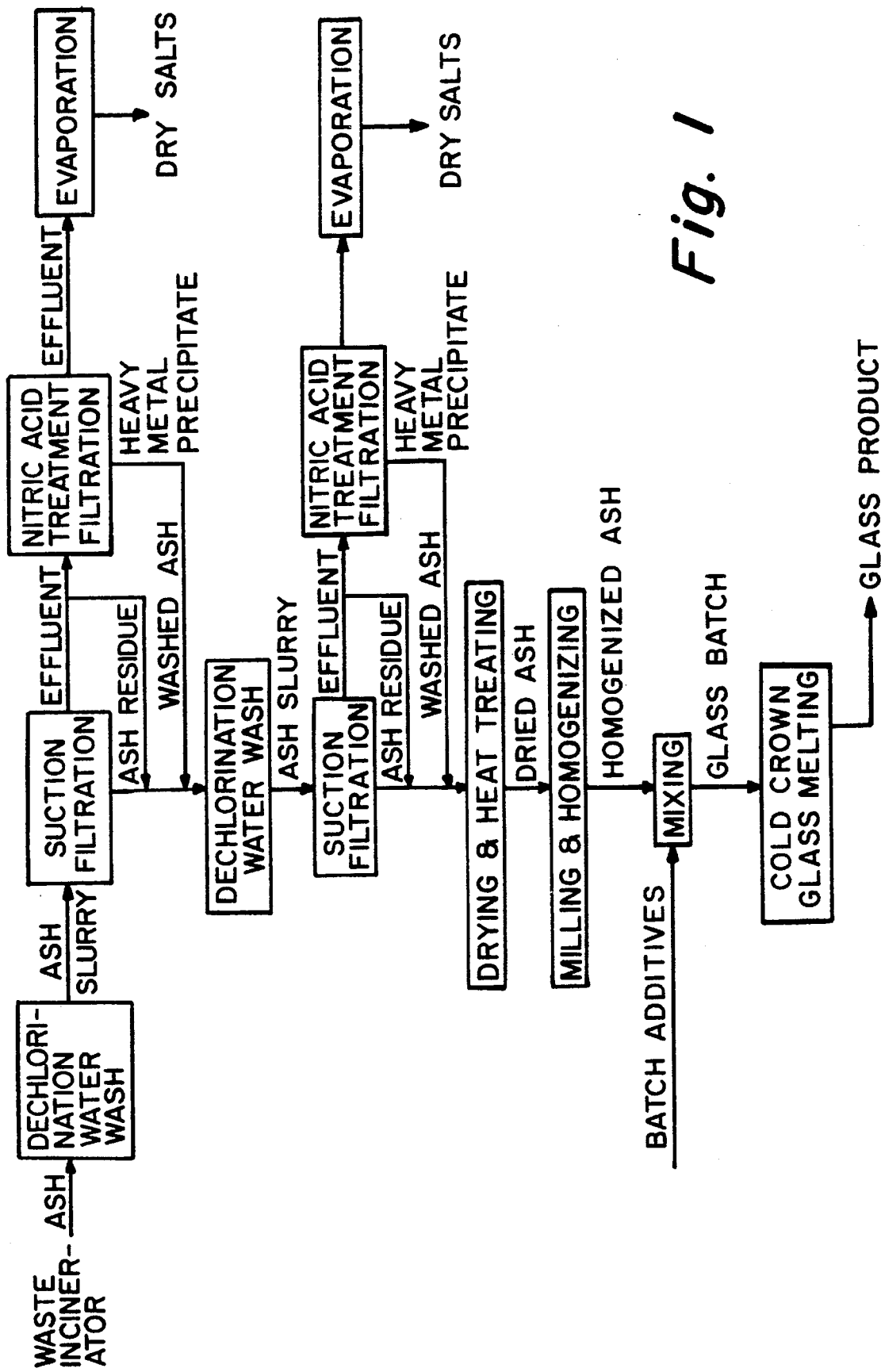
FIG. 1 is a schematic diagram of the process, embodying the preferred method of the present invention, for treatment and disposal of incinerator ash from a waste incinerator.

Referring to the schematic of the process (FIG. 1), the first step of the inventive process, if the incinerator ash contains a high chloride content, involves a pretreating step involving dechlorinating the ash so that the ash contains less than 3% by weight chlorine. On the other hand, if the supplied ash is already sufficiently chloride-free, i.e., less than 3% by weight chloride, no dechlorination is necessary. It is batched, as supplied, with the proper additives, if needed, and vitrified in the embodied cold crown:

There are several dechlorination procedures that could have been utilized; however, a simple water wash, with or without pH control, is the preferred method of removing the soluble chlorides from the ash. Regardless of the dechlorination procedure utilized, the resultant ash should contain less than about 3% by weight Cl. The other dechlorination procedures which could be utilized are:

(1) Adding the supplied ash to a concentrated $HNO_3$ solution resulting in the oxidation of Cl to produce NOCl, $Cl_2$ and $H_2O$ which remain in solution, while the heavy metals remain in the resultant ash.

(2) Adding the supplied ash residue to an NaOH solution resulting in the precipitation of the heavy metal hydroxides, while the Cl in remains in solution.

(3) Adding the supplied ash to water and treating it with sodium citrate resulting in an effluent solution of NaCl, while the heavy metals remain as citrate precipitates as pan of the resultant ash. Regardless of the method used, the Cl ends up in a solution and is then separated from the ash precipitate and subsequently dried. This dried ash is then used as a component of the glass batch and then subsequently vitrified to incorporate the heavy metal portion of the supplied ash into the amorphous glass structure.

Table I reports the composition of an incinerator ash, supplied by the U.S. Environmental Protection Agency, from a state-of-the-art municipal solid waste incinerator, which utilized a lime injection scrubber for HCl effluent control. The analyzed composition, in parts by weight, is reported prior to (A/B) and following ($A_1$ & $A_2$/$B_1$) the above-described water wash dechlorination. Water essentially comprises the remaining portion of the analyzed compositions.

TABLE I

|  | A | $A_1$ | $A_2$ | B | $B_1$ |
|---|---|---|---|---|---|
| $SiO_2$ | 11.1 | 17.3 | 17.2 | 11.2 | 18.7 |
| $Al_2O_3$ | 5.99 | 9.84 | 9.86 | 5.38 | 9.48 |
| CaO | 35.9 | 38.9 | 36.2 | 37.2 | 39.93 |
| $Na_2O$ | 2.87 | 1.35 | 1.43 | 3.15 | 1.78 |
| $Fe_2O_3$ | 1.13 | 1.75 | 1.73 | 1.24 | 2.01 |
| $K_2O$ | 2.95 | 2.80 | 2.86 | 2.62 | 2.54 |
| $Li_2O$ | <0.01 | <0.01 | <0.01 | <0.01 | <0.01 |
| $Cr_2O_3$ | 0.033 | 0.047 | 0.046 | 0.022 | 0.033 |
| PbO | 0.44 | 0.042 | 0.41 | 0.52 | 0.72 |
| C | 1.49 | 2.22 | 2.21 | 1.71 | 2.17 |
| $As_2O_3$ | 0.009 | 0.012 | 0.013 | 0.00674 | 0.0079 |
| CdO | 0.027 | 0.0041 | 0.038 | 0.029 | 0.028 |
| BaO | 0.052 | 0.047 | 0.049 | 0.047 | 0.045 |
| CuO | 0.055 | 0.085 | 0.084 | 0.0445 | 0.0612 |
| $MoO_3$ | 0.01 | 0.014 | 0.014 | 0.0038 | 0.0497 |
| NiO | 0.005 | 0.009 | 0.009 | 0.0038 | 0.0054 |
| $SO_3$ | 7.46 | 13.2 | 13.7 | 6.95 | 13.86 |
| ZnO | 1.87 | 2.76 | 2.80 | 0.0067 | 0.0111 |
| $TiO_2$ | 1.18 | 1.86 | 1.78 | 0.85 | 1.33 |
| Cl | 15.8 | 2.40 | 2.60 | 16.9 | 2.22 |

The following discussion specifically details certain pretreating techniques utilized in the inventive method described herein.

Referring specifically now to the preferred water wash method of dechlorination, a 10–12 pound sample of the supplied chloride-rich ash (A) was mixed with distilled water in a glass cylinder at a 5:1 water volume to ash weight ratio. The resultant ash solution was then mixed for approximately 15–30 minutes using a high speed mixer which contained rotary "TEFLON®" coated blades. The solution was then allowed to settle overnight. Following settling, the clear effluent layer, containing approximately 85% of the wash water, was then removed by siphoning with the assistance of a vacuum pump. This effluent or resulting aqueous phase was filtered through "WHATMAN®" 41 filter paper using a large "BUCHNER®" funnel. The ash residue remaining on the filter paper, particularly the charred paper residue which floated on the surface of the wash slurry, was returned to the washed ash with the same volume of distilled water. The pH of the filtrate was consistently in the narrow range of 12.1–12.3.

The wet ash was then again mixed with water; the second water wash involved using the same 5:1 water ash ratio and stirring procedure. Again, the ash was allowed to settle, this time approximately 4 hours, and the resulting slurry was then filtered as previously described. As in the first wash, about 85–87% of the added water was recovered, and all filtrates had a pH in the range of 12.1–12.3. The final wet ash contained about 13% of the water added in the washing steps and the resulting Cl content of the washed ash was less than 3% by weight.

The wet ashes were then transferred to "PYREX®" beakers and dried overnight in a heavy duty oven at 200° C. The dried ash was subsequently heat-treated at 500° C. for 16 hours. The combined drying and calcining were employed in order to remove the excess water and reduce the carbon content to less than 3%. In the calcination process, mercury is removed from the washed ash as the mercury compounds present decompose below 450° C. and convert to the volatile mercury metal. The mercury can be recovered by adsorption of the gas onto activated carbon substrate or pellets or can be recovered from the gas stream by condensation.

Following the two water wash steps, all of the filter papers used in the filtration of ash from the wash slurry were collected together and dried at 100° C. for 16 hr. The filter papers were then weighed to determine the accumulated ash residue compared to the pristine filter paper. For the dual water wash, 87.2 grams of ash residue were retained in the filter paper. In a large scale melt, the filter paper and ash would simply be added back to the ash for vitrification, thereby eliminating a potential waste stream requiring another disposal process. Alternatively, the filter papers could have been charred at 500° C. and the ash residue would then have been added back to the ash stream.

Although the pure water washing of the ash did result in the elimination of most of the chlorides, it did, however, result in the loss of some Pb and Cd to the wash effluent. Lead and cadmium hydroxides, which exist as hydrous oxide precipitates of the nature of $Pb(OH)_2$ and $Cd(OH)_2$ when the pH is between 7–10, dissolve into solution when the pH exceeds these values. Therefore, since the pH during the water wash was in excess of 12, the lead and cadmium hydroxide were at least partially solubilized according to the following reactions:

$$Cd(OH)_2 + 2\ OH^- \rightarrow Cd(OH)_4^{2-}$$

$$Pb(OH)_2 + 2\ OH^- \rightarrow Pb(OH)_4^{2-}$$

To verify that some metal species were lost to the effluent of the water wash, a 1 pound sample of the supplied ash compositions was dechlorinated using the water wash method. The concentrations of the Pb and Cd species in the water effluent, both the first and second washes, were determined to be as follows:

|  | Cd(ppm) | Pb(ppm) |
|---|---|---|
| Wash #1 | 0.010 | 256 |
| Wash #2 | 0.005 | 40 |

The final dried ash had a CdO content of 0.033% and PbO content of 0.383%.

However, this lead and cadmium can be recovered from the wash effluent by treating the effluent with concentrated 10 molar nitric acid. The wash is adjusted to a pH of ~9–10, to recover the heavy metals as hydroxides. Only 3 ml of concentrated nitric acid per 1000 ml of effluent is needed to adjust the pH. The solution is then heated to 80° C. to digest the precipitate, and the lead-cadmium species filtered off. The lead and cadmium content of the resultant effluent after precipitation is <0.1 ppm and <0.1 ppm, respectively. The lead/cadmium precipitate can then be added back to the washed ash for vitrification. It is noted that Zn, Cu, Cr and Ni hydroxides can also precipitate in the pH range of operation and trace quantities were certainly present with the Pb and Cd precipitates. However, since these metals were present in trace quantities, they were not previously analyzed for in the wash waste stream. If the wash effluent is allowed to stand for seven days, all of the residual heavy metals are precipitated because of densification of the flocculated precipitates which had formed originally. This results in the wash effluent having a Pb concentration of less than 2 ppm and Cd concentration less than 0.02 ppm.

Alternatively, rather than including an extra step of adding nitric acid to precipitate the lost heavy metals, the pH during both first and second water wash could have been maintained between 9.0–9.5. As a result, most of the Pb and Cd would have remained as hydroxide precipitate, i.e., part of the ash, rather than dissolving in solution and becoming filtered off as part of the aqueous phase. Again, in order to verify this, a 1-lb test sample of ash was used dechlorinated, while maintaining the pH within the proper range. Following an addition of a five fold weight of water (2270 ml), the solution required 150 ml of concentrated $HNO_3$ solution (70.3 wt. % $HNO_3$) to maintain a pH of around 9.5–10.0. After filtration of the ash and precipitate as per previous description, the second wash was effected with only 2–3 ml of concentrated $HNO_3$ necessary to maintain a pH of 9.5–10.0. The concentrations of the heavy metal ions in the respective effluent were determined to be as follows:

|  | Pb(ppm) | Cd(ppm) |
| --- | --- | --- |
| Wash filtrate #1 | 0.89 | <0.1 |
| Wash filtrate #2 | 0.28 | <0.1 |

The other heavy metal ions present in the ash, such as Zn, Cu and Cr, were present in sufficiently small quantities as to not be of a major concern in the effluent. The resultant dried ash after this process had 0.048% CdO and 0.728% PbO.

Another process which could be utilized to minimize dissolution of heavy metals from the ash involved addition of oxalic acid ($H_2C_2O_4$) to the first and second water wash. The oxalic acid was added in an amount equal to 1.5% of the weight of the ash. As a result, all the heavy metals remaining in the wash effluents were precipitated as insoluble oxalate species and remained with the ash residue. The remaining oxalic acid remains dissolved in the aqueous effluent stream. If necessary, after the addition of oxalic acid and precipitation is complete, the pH was restored to 9.5 by addition of 1 m NaOH solution. The concentrations of Pb and Cd species in the water effluent, both the first and second washes, were determined to be as follows:

|  | Pb(ppm) | Cd(ppm) |
| --- | --- | --- |
| Wash #1 | <2 | <0.02 |
| Wash #2 | <2 | <0.02 |

The metal oxalate species remaining in the ash decomposed when subjected to the 500° C. drying process. Therefore, no residual carbon remained to interfere with the ash vitrification and the production of a transparent glass.

Once the ash to be vitrified contains less than 3%, by weight, chloride, regardless of whether received as such or because of pretreatment, the ash is dried and again analyzed in order to determine the ash composition for batching. From the analyzed ash composition, the amount and type of additives necessary to produce the proper glass are determined. The additives added to the ash were carefully selected and their concentrations controlled to ensure that the resulting glass batch is easily vitrifiable and able to be formed and delivered at a reasonable rate. In addition, the glass must vitrify into a single phase glass having excellent acid durability; a durability such that the glass has a weight loss of no more than, and preferably less than, 10.0 mg/cm$^2$ when immersed in 5% HCl solution at 95° C. for 24 hours. It should be noted that these glasses should possess a viscosity of about 1000 poise within the temperature range of 1000°–15000° C. This viscosity range allows the glass to be delivered continuously from the melter during any type of cold crown melting process. This viscosity would be especially needed during a large scale cold crown melting process which would be utilized for vitrification of large quantities of incinerator ash; an example being a "VER-MBL®" type cold crown melter. It should be noted that it is possible that the ash requires no additives i.e., those instances when the composition of the ash falls within the claimed glass range.

The principal area of glass compositions from which a glass composition is batched and employed for ash vitrification is found in the general $CaO—Al_2O_3—SiO_2$ glass family. Glasses within this family possess a broad range of meltability, viscosity, and the above-described excellent acid durability Specifically, the composition range of those glasses, in weight percent, is reported in Table H.

TABLE II

|  | Weight % |
| --- | --- |
| $SiO_2$ | 47–76 |
| $Al_2O_3$ | 0.8–29 |
| CaO | 3.4–33 |
| $R_2O$ | 0–25 |
| $B_2O_3$ | 0–18 |
| $ZrO_2$ | 0–7 |
| $TiO_2$ | 0–7 |
| $Fe_2O_3$ | 0–5 |
| MO | 0–10 |
| $ZrO_2$ | 0–7 |

The $R_2O$ in the above composition range is chosen from the alkali metal oxides, i.e., $Li_2O$, $Na_2O$, and $K_2O$. With incinerator ash as a component in the batch, the alkali content is usually 1–5% by weight or greater because of typical levels of alkali ($Na_2O$, $K_2O$ in particular) commonly observed in these incinerator residues. Also, up to 10 weight % MO, wherein MO is MgO, SrO or BaO, can also be incorporated into the glass composition along with, or in lieu of CaO. The combined content of alkali and alkaline earth metal should not exceed 38% to preserve acid durability. The glass may include a number of optional constituents: PbO, CdO, $Cr_2O_3$, $MoO_3$, and NiO, in an amount not to exceed 8% by weight of the glass batch. When incinerator ash is used as a batch material, the resultant glass batch will usually contain less than 0.5% by weight of each of these constituents. Chloride and fluoride may also be present in the glass batch in quantities not to exceed 3%, while $SO_3$ may be present in amounts up to 1.5%.

The following discussion outlines specific mixing and melting parameters employed in forming the examples reported below.

Once the proper batch was achieved, i.e., the addition of the necessary additives to result in a glass composition within that reported in Table II, the batch was then turbula mixed for an additional 30 minutes before being vitrified. Nitrates were specifically added to the batch to ensure an oxidizing atmosphere for the melt. This was critical in preventing formation of molten metals in the glass or batch blanket.

Figure 2:
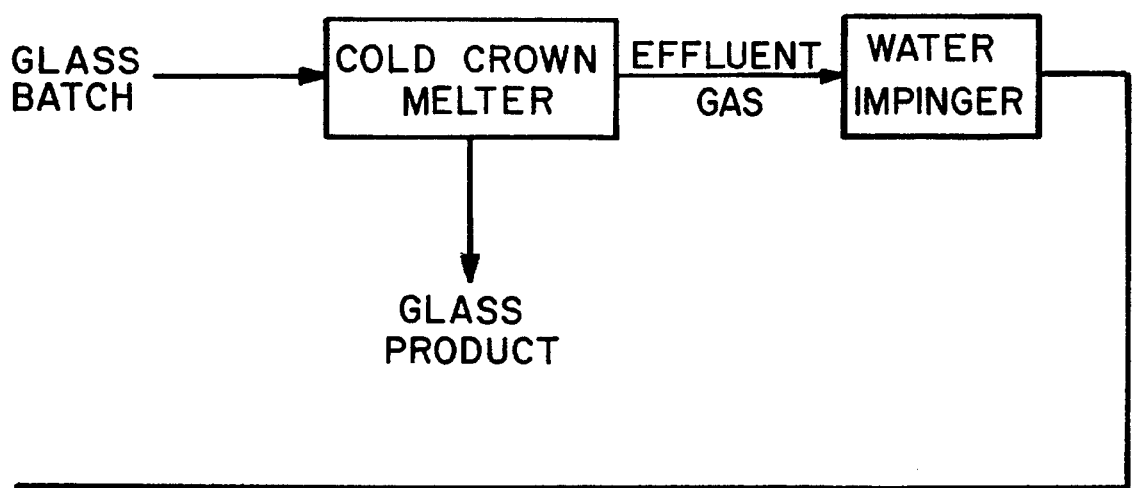
FIG. 2 is a schematic of the cold crown melting process and the effluent collection system which is used during the melting.
Figure 2:
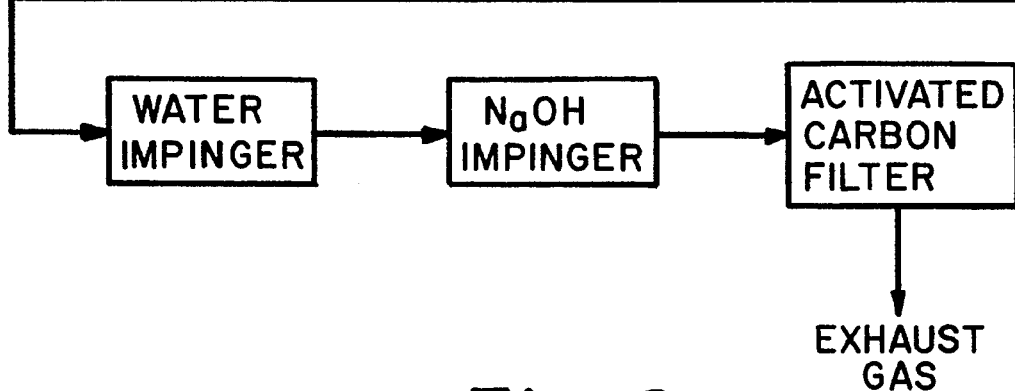

FIG. 2. schematically illustrates the cold crown melting system utilized in the laboratory scale melt, including the melting unit and the effluent collection system. The melting unit consisted of a 5 liter silica crucible in a Glo-bar heated box furnace. Only the bottom half of the crucible was heated to allow retention of a batch cold crown, thus simulating a typical commercial cold crown melting system. The furnace and the crucible were preheated to 1400° C. for 24 hours prior to the melt to ensure crucible stability. The batch mixture was added to the crucible after which a "PYREX®" glass canopy connected to the effluent handling system was placed over the top of the crucible to assure maximum collection of gases and particulates. For subsequent additions of batch, the canopy was raised and lowered directly above the crucible to minimize effluent loss in this process. Obviously, in a large scale pilot operation the batch feed would be part of a closed system. Glass was delivered from the melter through a ⅛ orifice at the bottom of the crucible. The orifice was opened and closed with a water cooled stainless steel plug, which permitted control of the glass delivery. The glass was melted efficiently at 1400° C. Although this was the preferred melting temperature, the glass could have been melted anywhere in the range of 1350°–1550° C. The effectiveness of using cold crown melting was confirmed by the fact that the heavy metals were retained within the glass and batch blanket at the 99.99+% level.

Because of the exhaust which the cold crown vitrification process produced, it was necessary to utilize an effluent collection system (FIG. 2) similar to a typical commercial scrubber system. This System consisted of a "PYREX®" glass canopy which completely enveloped the batch blanket and crucible. Almost all effluent gas was drawn through the canopy to the impinger system. Gases and any particles were then exposed to three successive impinger solutions, water, water and a 1.2M NaOH solution which functioned as a backup for neutralizing gases. The last element of the impinger system consisted of a final activated carbon filter. Air flow into the impinger system was maintained at about 775 ft³/min, while the temperature of those effluent gases from the batch was generally below 150° C. Additionally, the two water impingers were kept in an ice bath (0° C.) to enhance the solubility of gases, especially HCl. This was done because the volatile acidic effluents from the batch were generally very soluble in cold water.

The main gaseous effluent from the vitrification of the supplied ash included $H_2O$, $NO_x$, $CO_2$, $SO_x$ and HCl (assuming there was some chloride remaining in the batch mixture). HCl was dissolved in the water and the NaOH impingers. $SO_x$, $NO_x$, and $CO_2$, although highly acidic, were only moderately soluble in cold water. The $NO_2$ reacted slowly even with NaOH, because of the disproportionation to $NO_2^{1-}$ and $NO_3^{1-}$ which also occurs during neutralization. Considerable $NO_x$ gas was lost in the exhausting process. Sufficient $SO_x$ was drawn through the impingers to cause a precipitate of sulfur to form on the activated carbon absorber. This was a result of the redox reaction of the strong oxidizing actions of the $SO_x$ species and the strong reducing character of the activated carbon.

However, during the vitrification of the batch mixture, only traces of volatile heavy metals (Pb, Cd, Cr, Zn) were found in the impingers. Typically, only 0.01–0.5% of the total of any of these heavy metals in the total batch were found in the impingers. No significant concentrations of heavy metals were, however, found on the carbon absorber. This was clear evidence of the retentive characteristic of heavy metal species in the cold crown melting process. It should be noted that any Hg present (<1 ppm) in the original ash was completely removed during the heat treatment (calcining) of the washed ash. Also, it must be noted that during the vitrification run some of the batch particles were drawn into the impinger solutions because no provision was made for handling the dusting of the batch. Some batch material was adsorbed onto the surface of the canopy during batch filling of the crucible and from steam stripping from the batch. In actual practice, conventional wetting procedures and batch preparation would minimize this effect.

It is expected that any of the glasses within the above defined range would also possess the requisite resistivity for effective electric melting, not a concern in the above described resistance heating. As an example, these batched glasses disclosed could be melted in a "VERMEL®" type cold crown reciter which utilizes the contemplated electric melting.

It is anticipated that non-hazardous and hazardous incinerator ashes and bottoms ashes will be vitrifiable, as there appear to be no major fundamental composition differences in heavy metal content and the major glass forming species present, e.g., $SiO_2$, CaO, $Na_2O$ are compatible in the melting of the soda lime-type glasses with little or modest additions of additives.

Following vitrification, glasses within this composition range were extremely inert with very low leach rates, i.e., acid durabilities well below those requirements established by the EPA's TCLP standards. This test established by the Environmental Protection Agency (EPA) was published in the Mar. 29, 1990 issue of the Federal Register (55 FR 11798), and subsequently revised in the Jun. 29, 1990 issue (55 FR 26986). The actual TCLP test appears as Appendix II of the published rule and is titled "Method 1311 Toxicity Characteristic Leaching Procedure (TCLP)". The acid durability standard described and utilized by the inventors herein was used as a estimation of the ability to pass the TCLP test. The acid durability test is much quicker and less expensive; any glass which possessed an acid durability such that the weight loss of the glass in 5% HCl solution at 95° C. is 10.0 mg/cm² or less in 24 hours will easily pass the less severe standards set forth in the TCLP test. All acid durabilities reported herein are listed as the weight loss (g/cm²) under these conditions.

Although the inventive process as is described herein reflects laboratory practice only, it will be appreciated that both the pretreatment process and the glass forming are capable of being utilized on a commercial scale. For example, the "VERMEL®" type cold crown melter mentioned throughout the above-described process is representative of a typical commercial melting system contemplated.

EXAMPLES

Examples 1 to 3

Table III reports the analyzed compositions in parts by weight of five essentially chloride- and carbon free ashes. Ashes C,D and E formed glasses within the desired composition without any additives, and therefore these ashes alone formed the glass batch. Table IV reports the glass compositions in weight percent of these three ashes as batched prior to vitrification. The TCLP results for three heavy metals reported therein, Cadmium (mg/L Cd), Chromium (mg/L Cr), Lead (mg/L Pb), are well below those leachability rates typical of glasses having an acid durability such that the weight loss of the glass in 5% HCl solution at 95° C. is 10.0 mg/cm² or less in 24 hours.

TABLE III

|   | C | D | E | F | G |
|---|---|---|---|---|---|
| $K_2O$ | 2.07 | 2.29 | 3.1 | 3.2 | 1.48 |
| $Na_2O$ | 4.68 | 5.29 | 5.27 | 3.12 | 8.17 |
| $Al_2O_3$ | 17.4 | 15.3 | 8.16 | 17.0 | 4.99 |
| CaO | 11.1 | 11.2 | 9.25 | 13.6 | 24.9 |
| CdO | 0.01 | 0.014 | — | 0.033 | 0.0027 |
| $Cr_2O_3$ | 0.020 | 0.030 | 0.02 | 0.047 | 0.018 |
| $Fe_2O_3$ | 2.24 | 2.38 | 1.3 | — | 0.95 |
| MgO | 1.98 | 2.0 | 0.65 | — | — |
| PbO | 0.272 | 0.38 | 0.32 | 0.52 | 0.29 |
| $SiO_2$ | 37.8 | 35.2 | 56.0 | 31.9 | 44.94 |
| C | 5.08 | 4.03 | 3.32 | 1.9 | 0.25 |
| $Na_2O$ | — | — | — | — | 8.17 |
| $As_2O_3$ | — | — | — | — | 0.00512 |
| BaO | — | — | — | — | 0.043 |
| CuO | — | — | — | — | 0.0310 |
| $MoO_3$ | — | — | — | — | 0.0027 |
| NiO | — | — | — | — | 0.0029 |
| ZnO | — | — | — | — | 1.54 |
| $TiO_2$ | — | — | — | — | 0.99 |
| $Li_2O$ | — | — | — | 0.01 | <0.01 |
| $SO_3$ | — | — | — | 2.2 | 5.72 |
| Cl | — | — | — | 1.5 | 3.89 |

TABLE IV

|   | 1 | 2 | 3 |
|---|---|---|---|
| $SiO_2$ | 48.7 | 47.5 | 66.6 |
| $Al_2O_3$ | 22.4 | 20.7 | 9.7 |
| $Na_2O$ | 6.0 | 7.1 | 6.3 |
| CaO | 14.3 | 15.1 | 11.0 |
| $K_2O$ | 2.7 | 3.1 | 3.7 |
| $Fe_2O_3$ | 2.9 | 3.2 | 1.5 |
| MgO | 2.6 | 2.6 | 0.8 |
| PbO | 0.3 | 0.5 | 0.4 |
| Ash Type | C | D | E |

Examples 4 and 5

Table V reports the composition of two different glasses formed from ash F. Ash F, although not requiring dechlorination, still required certain additives or glass forming materials in order to obtain a glass batch which, when vitrified, came within the claimed composition and thus the requisite properties, specifically durability. The actual batch additives were:

|   | Example 4 | Example 5 |
|---|---|---|
| Sand | 99 g | 120 g |
| Ash | 200 g | 200 g |
| Sodium Nitrate | 45 g | 70 g |

Table V also reports both the acid durability and the TCLP data for Cadmium (mg/L Cd), Chromium (mg/L Cr) and Lead (mg/L Pb) for both Examples. Since the respective acid durabilities of these glasses, weight losses of 1.1 mg/cm$^2$ and 0.3 mg/cm$^2$, respectively, correspond to the reported TCLP data which is well below that required by the EPA, it thus can be surmised that an acid durability which results in a weight loss of the glass in 5% HCl solution at 95° C. of 10.0 mg/cm$^2$ or less in 24 hours is sufficient to pass the EPA'S TCLP test.

TABLE V

|   |   | 4 | 5 |
|---|---|---|---|
| | $SiO_2$ | 64.1 | 64.7 |
| | $Al_2O_3$ | 13.4 | 12.0 |
| | $Na_2O$ | 8.8 | 11.1 |
| | CaO | 10.7 | 9.6 |
| | $K_2O$ | 2.5 | 2.3 |
| | PbO | 0.4 | 0.4 |
| | Cl | ~0.8 | ~0.8 |
| Acid Durability | | 1.1 | 0.31 |
| Ash type | | F | F |
| TCLP Test | mg/L Ba | 0.39 | 0.21 |
| | mg/L Cd | <0.1 | <0.1 |
| | mg/L Cr | 0.17 | <0.1 |
| | mg/L Pb | 0.15 | <0.1 |

Examples 6 and 7

Ashes A1 and A2, reported in Table I, although dechlorinated, required the addition of additional glass forming materials in order to achieve the proper batch which was capable of being subsequently vitrified into an acceptable and durable glass body falling within the claimed composition. The list of the batch ingredients which formed the proper batch for both Examples is as follows:

| Sand | 12,336 g |
|---|---|
| Ash A1 (or A2) | 18,000 g |
| Sodium Carbonate | 3,004 g |
| Sodium Nitrate | 1,390 g |

The batch mixture was subsequently vitrified to form the glasses reported in Table VI. Also reported therein are the properties of the glasses; there is only one value for each property because, compositionally, Examples 6 and 7 were so similar that the property value each possessed was equivalent.

TABLE VI

|   | 6 | 7 |
|---|---|---|
| $K_2O$ | 0.94 | 0.93 |
| $Na_2O$ | 5.61 | 5.63 |
| $Al_2O_3$ | 6.20 | 6.21 |
| $As_2O_3$ | 0.0079 | 0.0082 |
| BaO | 0.029 | 0.030 |
| CaO | 22.0 | 22.4 |
| CdO | 0.029 | 0.030 |
| $Cr_2O_3$ | 0.029 | 0.028 |
| CuO | 0.049 | 0.048 |
| $Fe_2O_3$ | 1.05 | 1.08 |
| $MoO_3$ | 0.008 | 0.008 |
| NiO | 0.006 | 0.006 |
| PbO | 0.25 | 0.29 |
| $SiO_2$ | 56.7 | 56.3 |
| $TiO_2$ | 1.15 | 1.17 |
| ZnO | 1.86 | 1.88 |
| C | 0.008 | 0.008 |
| $SO_3$ | 1.60 | 1.45 |
| Annealing point (°C.) | 637 | |
| Strain point (°C.) | 598 | |
| Softening point (°C.) | 808 | |
| Density (g/cm$^2$) | 2.719 | |
| Thermal Expansion (×10$^{-7}$/C) | 80.3 | |
| TCLP leachability | | |
| mg/L Cd | <0.01 | |
| mg/L Cr | <0.001 | |
| mg/L Pb | <0.1 | |

Examples 8 to 11

Table VH reports 4 additional "as analyzed" glass compositions which were vitrified after batching with the Ash A disclosed in Table I.

TABLE VII

|  | 8 | 9 | 10 | 11 |
|---|---|---|---|---|
| $SiO_2$ | 61.7 | 61.6 | 66.9 | 69.0 |
| CaO | 24.5 | 22.5 | 18.5 | 14.0 |
| $Na_2O$ | 4.07 | 11.36 | 5.3 | 10.6 |
| $Al_2O_3$ | 4.17 | 5.24 | 4.59 | 2.35 |
| $Fe_2O_3$ | .70 | .74 | .588 | .457 |
| $K_2O$ | 2.88 | 2.68 | 3.87 | 9.07 |
| PbO | .044 | .063 | .061 | .071 |
| $Cr_2O_3$ | .02 | .021 | .017 | .012 |
| CdO | .001 | .001 | .001 | .002 |
| Cl | 1.7 | 1.1 | .94 | 1.2 |
| $SO_3$ | .025 | .12 | .060 | .095 |
| Acid Durability ($mg/cm^2$) | 0.6 | 0.06 | 0.02 | 0.03 |
| Softening Point (°C.) | 808 | 834 | 831 | 754 |
| Strain Point (°C.) | 598 | 621 | 610 | 540 |
| Annealing Point (°C.) | 637 | 659 | 651 | 579 |
| Thermal Expansion ($\times 10^{-7}$/°C.) | 80.3 | 73.9 | 71.5 | 82.6 |
| Density (g/cc) | 2.719 | 2.689 | 2.731 | 2.674 |

These glass compositions were selected to produce a melting and delivery rate of approximately 5–8 lb./hr in the melter described herein.

For example, Example 8 possessed a sufficiently low viscosity to allow easy delivery of glass through the ¼" orifice in the crucible in the above-described cold crown reciter. The temperature at which the glass exhibits 1000 poise, i.e., that viscosity which allows the glass to be properly and continuously delivered from the melter, is about 1275° C. Examples 9–11 also possessed viscosities consistent with the delivery of glass in the 1000°–1500° C.

The glass of Example 8 which was obtained from the above melt was formed into cullet by direct feed into water, and cast into three inch diameter patties which were subsequently annealed at 575° C. The glass produced was clear, dark green and seedy, but free of stones. Some solid inclusions, mostly of refractory, did occur at the beginning of the first delivery of glass or in glass at the extreme end of a delivery cycle where the volume of melted glass was low in the crucible. Table VII also reports the physical properties of the Examples 8–11 following vitrification; these are representative of the properties of the typical inventive glasses.

Examples 12–17

Table VIII reports several more glass compositions which possess sufficient durability in order to encapsulate the heavy metals and thus pass the standards set by the EPA's TCLP test. Ashes $B_1$ (dechlorinated Ash B) and G, as reported in Tables I and III respectively, were used in the batch of these glasses, but as was earlier the case with Ashes A1 and A2, the Ash B1 composition lacked the proper raw materials to form an acceptable glass within the claimed range. Thus, it required the addition of certain glass forming materials. The actual batch which was vitrified to form the Example 17 glass is illustrative of the batching process used for all the Examples reported in Table VIII. The actual batch ingredients are as follows:

| Sand | 3733 g |
|---|---|
| Ash B | 4053 g |
| Sodium Carbonate | 296 g |
| Sodium Nitrate | 350 g |
| Alumina | 502 g |
| Boric Oxide | 1334 g |

TABLE VIII

|  | 12 | 13 | 14 | 15 | 16 | 17 |
|---|---|---|---|---|---|---|
| $SiO_2$ | 69.60 | 65.52 | 57.44 | 62.64 | 56.28 | 55.52 |
| $Al_2O_3$ | 5.43 | 9.41 | 9.35 | 10.62 | 12.44 | 7.07 |
| CaO | 7.52 | 6.84 | 7.85 | 7.13 | 9.35 | 10.12 |
| $Na_2O$ | 4.98 | 2.62 | 4.34 | 5.39 | 6.13 | 6.27 |
| $B_2O_3$ | 8.42 | 12.72 | 15.72 | 9.82 | 12.55 | 13.07 |
| MgO | 2.0 | 1.00 | 2.65 | 2.34 | 2.00 | 4.16 |
| $K_2O$ | 1.7 | 1.08 | 1.48 | 0.54 | 0.71 | 1.45 |
| $Fe_2O_3$ | 0.68 | 0.78 | 0.93 | 1.18 | 1.0 | 0.93 |
| PbO | 0.094 | 0.107 | 0.105 | 0.110 | 0.106 | 0.134 |
| CdO | 0.006 | 0.006 | 0.005 | 0.006 | 0.006 | 0.007 |
| $Cr_2O_3$ | 0.0040 | 0.0045 | 0.0041 | 0.0049 | 0.0045 | 0.0057 |
| BaO | 0.0099 | 0.0114 | 0.0062 | 0.0106 | 0.0012 | 0.0143 |
| ZnO | 0.0013 | 0.0015 | 0.0013 | 0.0016 | 0.0015 | 0.0019 |
| NiO | 0.0010 | 0.001 | 0.001 | 0.001 | 0.001 | 0.002 |
| $MoO_3$ | 0.001 | 0.001 | 0.001 | 0.001 | 0.001 | 0.002 |
| $TiO_2$ | 0.15 | 0.16 | 0.20 | 0.21 | 0.22 | 0.25 |
| $As_2O_3$ | 0.0012 | 0.0012 | 0.0014 | 0.0013 | 0.0014 | 0.0018 |
| Cl | <0.10 | <0.10 | <0.10 | <0.10 | <0.10 | <0.10 |
| $SO_3$ | <0.10 | <0.10 | <0.10 | <0.10 | <0.10 | <0.10 |
| Ash Type | $B_1$ | $B_1$ | G | $B_1$ | G | $B_1$ |

Examples 18 to 35

TABLE IX reports several more glass compositions, as analyzed in weight percent, which were vitrified using either Ash C or E in the glass batch. As opposed to Examples 1 through 3 in which the ash alone formed the glass, each example has added to it additional amounts of borate and silica. Again, note that all the compositions reported therein possess acceptable durability for encapsulating heavy metals; well below those standards set by the EPA's TCLP test.

TABLE IX

| | 18 | 19 | 20 | 21 | 22 | 23 |
|---|---|---|---|---|---|---|
| $SiO_2$ | 57.56 | 52.45 | 65.31 | 66.1 | 67.8 | 52.6 |
| $Al_2O_3$ | 16.11 | 16.7 | 10.96 | 7.37 | 6.90 | 13.81 |
| CaO | 7.79 | 6.92 | 5.38 | 4.28 | 5.06 | 11.0 |
| $Na_2O$ | 3.28 | 7.77 | 3.08 | 7.51 | 3.29 | 3.73 |
| $B_2O_3$ | 4.81 | 7.97 | 5.58 | 9.0 | 11.30 | 7.36 |
| MgO | 7.1 | 5.3 | 0.35 | 2.34 | 2.18 | 7.87 |
| $K_2O$ | 1.46 | 1.31 | 4.88 | 2.54 | 2.51 | 1.66 |
| $Fe_2O_3$ | 1.68 | 1.37 | 0.73 | 0.62 | 0.71 | 1.74 |
| PbO | 0.20 | 0.15 | 0.18 | 0.15 | 0.17 | 0.22 |
| CdO | 0.007 | 0.006 | <0.001 | <0.001 | <0.001 | 0.008 |
| $Cr_2O_3$ | 0.014 | 0.012 | 0.012 | 0.009 | 0.010 | 0.016 |
| BaO | 0.15 | 0.13 | 0.12 | 0.096 | 0.11 | 0.16 |
| ZnO | 0.092 | 0.084 | 5.27 | 0.067 | 0.079 | 0.113 |
| NiO | 0.001 | <0.001 | <0.001 | <0.001 | <0.001 | 0.002 |
| $MoO_3$ | <0.001 | <0.001 | <0.001 | <0.001 | <0.001 | <0.001 |
| $TiO_2$ | 0.15 | 0.13 | 0.22 | 0.16 | 0.20 | 0.17 |
| $As_2O_3$ | 0.000465 | 0.00398 | 0.00373 | 0.00311 | 0.00370 | 0.00516 |
| Cl | <0.1 | <0.1 | <0.1 | <0.1 | <0.1 | <0.1 |
| $SO_3$ | <0.1 | <0.1 | <0.1 | <0.1 | <0.1 | <0.1 |
| Ash Type | C | C | E | E | E | C |
| Ash Dur. | 3.5 | 9.4 | 0.05 | 0.10 | 0.03 | 6.2 |

| | 24 | 25 | 26 | 27 | 28 | 29 |
|---|---|---|---|---|---|---|
| $SiO_2$ | 50.9 | 51.9 | 55.9 | 54.1 | 53.4 | 56.4 |
| $Al_2O_3$ | 12.62 | 13.2 | 18.38 | 14.70 | 15.30 | 15.24 |
| CaO | 20.24 | 17.3 | 6.82 | 7.21 | 7.61 | 6.67 |
| $Na_2O$ | 3.4 | 3.57 | 2.89 | 2.75 | 3.22 | 3.80 |
| $B_2O_3$ | 7.6 | 9.02 | 11.9 | 4.60 | 3.69 | 7.09 |
| MgO | 1.45 | 1.44 | 1.23 | 5.33 | 5.66 | 4.72 |
| $K_2O$ | 1.52 | 1.6 | 1.29 | 2.40 | 1.44 | 2.22 |
| $Fe_2O_3$ | 1.59 | 1.67 | 1.36 | 1.01 | 1.51 | 0.94 |
| PbO | 0.19 | 0.20 | 0.17 | 0.25 | 0.19 | 0.23 |
| CdO | 0.007 | 0.008 | 0.006 | <0.001 | 0.006 | <0.001 |
| $Cr_2O_3$ | 0.014 | 0.016 | 0.012 | 0.015 | 0.013 | 0.014 |
| BaO | 0.15 | 0.15 | 0.13 | 7.59 | 7.96 | 2.60 |
| ZnO | 0.108 | 0.105 | 0.081 | 0.105 | 0.093 | 0.697 |
| NiO | 0.001 | 0.001 | 0.001 | 0.0012 | 0.0014 | 0.0015 |
| $MoO_3$ | <0.001 | <0.001 | <0.001 | <0.001 | <0.001 | <0.001 |
| $TiO_2$ | 0.16 | 0.15 | 0.13 | 0.028 | 0.014 | 0.027 |
| $As_2O_3$ | 0.000489 | 0.00477 | 0.00395 | 0.00848 | 0.00732 | 0.00774 |
| Cl | <0.1 | <0.1 | <0.1 | <0.10 | <0.10 | <0.10 |
| $SO_3$ | <0.1 | <0.1 | <0.1 | <0.10 | <0.10 | <0.10 |
| Ash Type | C | C | C | E | C | E |
| Ash Dur. | 4.2 | 6.6 | 6.9 | 2.8 | 0.5 | 3.1 |

| | 30 | 31 | 32 | 33 | 34 | 35 |
|---|---|---|---|---|---|---|
| $SiO_2$ | 58.2 | 59.9 | 59.3 | 59.7 | 61.6 | 64.8 |
| $Al_2O_3$ | 14.34 | 13.78 | 12.57 | 11.53 | 10.88 | 8.64 |
| CaO | 7.48 | 8.16 | 6.65 | 7.34 | 8.00 | 5.51 |
| $Na_2O$ | 3.16 | 3.45 | 3.79 | 4.18 | 4.55 | 3.68 |
| $B_2O_3$ | 8.34 | 9.65 | 7.06 | 8.15 | 9.46 | 12.87 |
| MgO | 2.82 | 1.72 | 4.70 | 2.78 | 1.65 | 0.99 |
| $K_2O$ | 1.42 | 1.53 | 2.22 | 2.45 | 2.51 | 1.05 |
| $Fe_2O_3$ | 1.56 | 1.61 | 0.93 | 1.03 | 1.11 | 1.09 |
| PbO | 0.18 | 0.19 | 0.23 | 0.25 | 0.26 | 0.14 |
| CdO | 0.007 | 0.008 | <0.001 | <0.001 | <0.001 | <0.005 |
| $Cr_2O_3$ | 0.014 | 0.066 | 0.014 | 0.016 | 0.017 | 0.01 |
| BaO | 2.62 | 0.11 | 2.54 | 2.55 | 0.15 | 0.13 |
| ZnO | 0.090 | 0.096 | 0.099 | 0.113 | 0.124 | 0.068 |
| NiO | 0.0013 | 0.0012 | 0.0012 | 0.0020 | 0.0022 | 0.0082 |
| $MoO_3$ | <0.001 | <0.001 | <0.001 | <0.001 | <0.001 | <0.001 |
| $TiO_2$ | 0.014 | 0.015 | 0.027 | 0.031 | 0.034 | 0.011 |
| $As_2O_3$ | 0.00715 | 0.00765 | 0.00783 | 0.00892 | 0.00981 | 0.00604 |
| Cl | <0.10 | <0.10 | <0.10 | <0.10 | <0.10 | <0.10 |
| $SO_3$ | <0.10 | <0.10 | <0.10 | <0.10 | <0.10 | <0.10 |
| Ash Type | C | C | E | E | E | C |
| Ash Dur. | 0.7 | 0.9 | 0.6 | 2.0 | 0.9 | 0.01 |

Examples 36 to 57

Table X reports several additional and varied compositions, as analyzed glass in weight percent, all of which demonstrate the requisite durability. Each glass was formed using both Ash A as part of the batch and Ash D as part of the batch. In either case, additional raw materials were added in order to form, following vitrification, the glass listed for each example. The durability listed in each example is the average between the ash A-based and Ash D-based glasses.

TABLE X

|  | 36 | 37 | 38 | 39 | 40 | 41 |
|---|---|---|---|---|---|---|
| $SiO_2$ | 75.5 | 75.5 | 75.5 | 52.9 | 72.5 | 67.0 |
| $Al_2O_3$ | 18.5 | 13.7 | 8.8 | 13.8 | 2.3 | 2.6 |
| $Fe_2O_3$ | .19 | .18 | .18 | .75 | .13 | .25 |
| $TiO_2$ | .13 | .13 | .12 | .51 | — | .17 |
| $Na_2O$ | .20 | 5.0 | 9.9 | .49 | 16.4 | 17.6 |
| CaO | 5.0 | 5.0 | 5.0 | 22.3 | 3.4 | 7.2 |
| ZnO | .25 | .25 | .25 | 1.11 | .17 | .36 |
| $K_2O$ | .20 | .20 | .2 | .40 | — | 1.2 |
| $B_2O_3$ | — | — | — | 7.5 | — | — |
| MgO | — | — | — | — | 5.0 | 3.5 |
| Acid Dur. | 0.6 | 0.07 | 0.06 | 2.36 | 0.15 | 0.01 |
| Acid Type | A/D | A/D | A/D | A/D | A/D | A/D |

|  | 42 | 43 | 44 | 45 | 46 | 47 |
|---|---|---|---|---|---|---|
| $SiO_2$ | 60.1 | 72.6 | 69.5 | 56.0 | 59.0 | 64.3 |
| $Al_2O_3$ | 14.4 | .8 | 2.1 | 28.7 | 18.5 | 18.7 |
| $Fe_2O_3$ | .61 | .19 | .15 | .34 | .24 | .22 |
| $TiO_2$ | .41 | .13 | .10 | .22 | .16 | .15 |
| $Na_2O$ | 4.8 | 16.9 | 11.9 | .30 | 1.50 | .20 |
| CaO | 18.2 | 5.2 | 4.1 | 9.5 | 6.7 | 6.0 |
| ZnO | .91 | .26 | .2 | .47 | .33 | .3 |
| $K_2O$ | .40 | .40 | 6.0 | .30 | .2 | .2 |
| $B_2O_3$ | — | — | 3.0 | 4.2 | 4.4 | — |
| MgO | — | 3.5 | 2.9 | — | 9.0 | — |
| BaO | — | — | — | — | — | 9.7 |
| Acid Dur. | 0.10 | 0.02 | 0.02 | 0.94 | 0.94 | 0.14 |
| Acid Type | A/D | A/D | A/D | A/D | A/D | A/D |

|  | 48 | 49 | 50 | 51 | 52 | 53 |
|---|---|---|---|---|---|---|
| $SiO_2$ | 59.0 | 56.1 | 65.0 | 62.5 | 62.6 | 58.45 |
| $Al_2O_3$ | 18.6 | 15.3 | 18.4 | 13.8 | 11.8 | 5.4 |
| $Fe_2O_3$ | 0.25 | 0.34 | 0.27 | 0.5 | 0.4 | 0.85 |
| $TiO_2$ | 0.17 | 0.23 | 0.18 | 0.3 | 0.3 | 0.5 |
| $Na_2O$ | 0.5 | 0.3 | 0.30 | 7.9 | 11.8 | 24.5 |
| CaO | 6.9 | 10.0 | 7.5 | 13.8 | 11.8 | 8.6 |
| ZnO | 0.34 | 0.5 | 0.37 | 0.7 | 0.6 | 0.1 |
| $K_2O$ | 0.2 | 0.2 | 0.20 | 0.5 | 0.5 | 0.3 |
| $B_2O_3$ | 5.0 | 4.2 | — | — | — | 0.5 |
| MgO | 8.9 | 6.8 | — | — | — | 0.8 |
| BaO | — | 5.8 | 7.5 | — | — | — |
| Acid Dur. | 0.37 | 0.25 | 0.12 | 0.10 | 0.10 | 3.44 |
| Acid Type | A/D | A/D | A/D | A/D | A/D | A/D |

|  | 54 | 55 | 56 | 57 |
|---|---|---|---|---|
| $SiO_2$ | 49.8 | 51.5 | 56.9 | 52.8 |
| $Al_2O_3$ | 8.9 | 9.5 | 7.7 | 7.5 |
| $Fe_2O_3$ | 1.0 | 0.3 | 0.5 | 0.3 |
| $TiO_2$ | 0.3 | 0.5 | 1.0 | 4.0 |
| $Na_2O$ | 5.2 | 14.8 | 12.5 | 11.6 |
| CaO | 31.8 | 19.9 | 15.6 | 20.0 |
| ZnO | 0.2 | 0.2 | 0.3 | 0.1 |
| $K_2O$ | — | 1.0 | 1.0 | 0.2 |
| $B_2O_3$ | 1.0 | 1.5 | — | 0.5 |
| MgO | 0.5 | 0.5 | 0.5 | 1.0 |
| BaO | 0.3 | 0.3 | 2.0 | 1.0 |
| SrO | — | — | 2.0 | 1.0 |
| Acid Dur. | 2.78 | 2.0 | 0.34 | 0.18 |
| Ash Type | A/D | A/D | A/D | A/D |

We claim:

1. A method of converting halogen-containing incinerator ash into a stable homogeneous single-phase glass, said method comprising:

(a) pretreating the incinerator ash so that the resulting pretreated ash contains less than about 3% halogen and less than about 3% C, by weight;

(b) mixing the pretreated ash portion with any additives necessary to make up a vitrifiable batch mixture which, when melted and cooled, will form a stable homogeneous, single-phase glass body, wherein the glass body is comprised of, expressed in terms of weight percent, about 47–76% $SiO_2$, 0.8–29% $Al_2O_3$, 3.4–33.0% CaO; 0–25% $R_2O$, wherein $R_2O$ is selected from the group consisting of $Na_2O$, $Li_2O$, and $K_2O$, 0–5% $Fe_2O_3$, 0–18% $B_2O_3$, 0–7% $ZrO_2$, 0–7% $TiO_2$, 0–10% MO, wherein MO is selected from the group consisting of MgO, BaO, ZnO or SrO, 0–8% of at least one member selected from the group consisting of PbO, CdO, $Cr_2O_3$, CuO and NiO, 0–4% $SO_3$ and 0–4% Cl+F;

c) melting the vitrifiable batch mixture; and, d) cooling the vitrifiable mixture to form a stable homogeneous single-phase glass body.

2. The method of claim 1, wherein the single-phase glass possesses an acid durability whereby the weight loss of the glass in 5% HCl solution at 95° C. is 10 mg/cm² or less in 24 hours and exhibits a viscosity of about less than 1000 poise (100 Pa•s) over the temperature range of about 1000° to 1500° C.

3. The method of claim 2 wherein the single-phase glass possesses an acid durability whereby the weight loss of the glass in 5% HCl solution at 95° C. is 2 mg/cm² or less in 24 hours.

4. The method 1 wherein the single-phase glass is comprised of, expressed in terms of weight percent, about 47–68% $SiO_2$, 2–23% $Al_2O_3$, 10–25% CaO, 5–15% $Na_2O$, and 0.5–4% $K_2O$.

5. The method of claim 1 wherein the single-phase glass is comprised of 50–68% $SiO_2$, 6.5–18.5% $Al_2O_3$, 4–21% CaO, 2–8.5% $Na_2O$, 4–13% $B_2O_3$ and 1–5% $K_2O$.

6. The method of claim 1 wherein the pretreating comprises the following steps:

(a) adding the incinerator ash to a quantity of water, resulting in a halogen-containing solution and an ash portion containing both heavy metal compounds and ash;

(b) separating the solution from the ash portion;

(c) removing any remaining water from the ash portion by heat-treating.

7. The method of claim 6 wherein the pH of the solution is maintained below about 10.

8. The method of claim 1 wherein the pretreating comprises the following steps:

(a) adding the incinerator ash to a quantity of water containing concentrated $HNO_3$, resulting in a halogen-containing solution and an ash portion containing both heavy metal compounds and ash;

(b) separating the solution from the ash portion;

(c) removing any remaining water from the insoluble ash portion by heat-treating.

9. The method of claim 1 wherein the pretreating comprises the following steps:

(a) adding the incinerator ash to a quantity of water containing sodium citrate, resulting in a halogen-containing solution and an ash portion containing both heavy metal compounds and ash;

(b) separating the solution from the ash portion; and (c) removing any remaining water from the ash portion by heat-treating.

10. The method of claim 1 wherein the pretreating comprises the following steps:

(a) adding the incinerator ash to a quantity of water containing NaOH, resulting in a halogen-containing solution and an ash portion containing both heavy metal compounds and ash;

(b) separating the solution from the ash portion;

(c) removing any remaining water from the ash portion by heat-treating.

11. The method of claim 1 which comprises melting the vitrifiable batch mixture in a cold crown melting unit.

12. The method of claim 11 which comprises maintaining oxidizing conditions in the melt during the melting.

13. A method of converting halogen-containing incinerator ash into a stable homogeneous single-phase glass, said method comprising:

a) mixing the ash with any additives necessary to make up a vitrifiable batch mixture which, when melted and cooled, will form a homogeneous, single-phase glass body wherein the glass body is comprised of, expressed in terms of weight percent, about 47–76% $SiO_2$, 0.8–29% $Al_2O_3$, 3.4–33.0% CaO, 0–25% $R_2O$, wherein $R_2O$ is selected from the group consisting of $Na_2O$, $Li_2O$, and $K_2O$, 0–5% $Fe_2O_3$, 0–18% $B_2O_3$, 0–7% $ZrO_2$, 0–7% $TiO_2$, 0–10% MO, wherein MO is selected from the group consisting of MgO, BaO, ZnO or SrO, 0–8% of at least one member selected from the group consisting of PbO, CdO, $Cr_2O_3$, CuO and NiO, 0–4% $SO_3$ and 0–4% Cl+F;

(b) melting the vitrifiable batch mixture; and, (c) cooling the vitrifiable batch mixture to form a stable homogeneous single-phase glass body.

14. The method of claim 13 wherein the single-phase glass possesses an acid durability whereby the weight loss of the glass in 5% HCl solution at 95° C. is 10 mg/cm$^2$ or less in 24 hours and exhibits a viscosity of about less than 1000 poise (100 Pa·s) over the temperature range of about 1000° to 1500° C.

15. The method as claimed in claim 14 wherein the single-phase glass possesses an acid durability whereby the weight loss of the glass in 5% HCl solution at 95° C. is 2 mg/cm$^2$ or less in 24 hours.

16. The method of claim 13 wherein the single-phase glass is comprised of, expressed in terms of weight percent, about 47–68% $SiO_2$, 2–23% $Al_2O_3$, 10–25% CaO, 5–15% $Na_2O$ and 0.5–4% $K_2O$.

17. The method of claim 13 wherein the single-phase glass is comprised of 50–68% $SiO_2$, 6.5–18.5% $Al_2O_3$, 4–21% CaO, 2–8.5% $Na_2O$, 4–13% $B_2O_3$ and 1–5% $K_2O$.

18. The method of claim 13 which comprises melting the vitrified batch mixture in a cold crown melting unit.

19. The method of claim 18 which comprises maintaining oxidizing conditions in the melt during the melting.

* * * * *